(12) United States Patent
Lee

(10) Patent No.: US 9,864,819 B2
(45) Date of Patent: Jan. 9, 2018

(54) THREE-DIMENSIONAL (3D) MODEL FILE, AND APPARATUS AND METHOD FOR PROVIDING 3D MODEL FILE

(71) Applicant: ELECTRONICS AND TELECOMMUNICATIONS RESEARCH INSTITUTE, Daejeon (KR)

(72) Inventor: Seung Wook Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/847,052

(22) Filed: Sep. 8, 2015

(65) Prior Publication Data

US 2016/0104315 A1 Apr. 14, 2016

(30) Foreign Application Priority Data

Oct. 10, 2014 (KR) .................. 10-2014-0136985
Jun. 16, 2015 (KR) .................. 10-2015-0085059

(51) Int. Cl.
*G06F 17/50* (2006.01)
*B33Y 50/00* (2015.01)

(52) U.S. Cl.
CPC .............. *G06F 17/50* (2013.01); *B33Y 50/00* (2014.12); *G06F 2217/12* (2013.01); *Y02P 90/265* (2015.11)

(58) Field of Classification Search
CPC ..................................................... B29C 67/00
See application file for complete search history.

(56) References Cited

U.S. PATENT DOCUMENTS

| | | | | |
|---|---|---|---|---|
| 6,420,698 | B1* | 7/2002 | Dimsdale | G01S 7/4811 |
| | | | | 250/205 |
| 6,778,181 | B1* | 8/2004 | Kilgariff | G06T 15/005 |
| | | | | 345/582 |
| 2009/0271323 | A1 | 10/2009 | Zinniel et al. | |
| 2010/0191360 | A1* | 7/2010 | Napadensky | B29C 67/0059 |
| | | | | 700/98 |
| 2014/0052285 | A1* | 2/2014 | Butcher | B29C 67/0051 |
| | | | | 700/98 |
| 2014/0168216 | A1 | 6/2014 | Kim et al. | |
| 2014/0192045 | A1 | 7/2014 | Hwang et al. | |
| 2016/0096318 | A1* | 4/2016 | Bickel | B29C 67/0051 |
| | | | | 264/40.1 |

OTHER PUBLICATIONS

Vidimče, K., Wang, S. P., Ragan-Kelley, J., & Matusik, W. (2013). OpenFab: a programmable pipeline for multi-material fabrication. ACM Transactions on Graphics (TOG), 32(4), 136.*
Kiril Vidimce et al., "OpenFab: A Programmable Pipeline for Multi-Material Fabrication", ACM Transactions on Graphics, Jul. 2013, vol. 32 Issue 4, ACM, U.S.A.

* cited by examiner

*Primary Examiner* — Ibrahim Siddo
(74) *Attorney, Agent, or Firm* — LRK Patent Law Firm

(57) ABSTRACT

A three-dimensional (3D) model file, and a method and apparatus for providing the 3D model file are provided. The method may include generating a 3D model file comprising a first field defining information associated with a printing material of a 3D model to perform 3D printing, and providing the 3D model file.

18 Claims, 6 Drawing Sheets

FIG. 2

```
IndexedMaterialSet {
    eventIn         MFInt32     set_colorIndex
    eventIn         MFInt32     set_colorIndex
    eventIn         MFInt32     set_normalIndex
    eventIn         MFInt32     set_texCoordIndex
    exposedField    SFString    unit                    #mm, cm, m, inch     —330
    exposedField    SFFloat     surfaceThickness        #unit is unit        —350
    exposedField    SFFloat     acquisitionResolution   #unit is unit        —370
    exposedField    SFNode      color                   NULL
    exposedField    SFNode      coord                   NULL
    exposedField    SFNode      normal                  NULL
    exposedField    SFNode      exCoord                 NULL
    field           SFBool      ccw                     TRUE
    field           MFInt32     colorIndex              []          # [-1,inf]
    field           SFBool      colorPerVertex          TRUE
    field           SFBool      convex                  TRUE
    field           MFNode      materialRegion          []                   —310
    field           SFFloat     creaseAngle             0           # [0,inf]
    field           MFInt32     normalIndex             []          # [-1,inf]
    field           SFBool      normalPerVertex         TRUE
    field           SFBool      solid                   TRUE
    field           MFInt32     texCoordIndex           []          # [0,inf]
}
```

FIG. 3

| MaterialRegion { | | | | |
|---|---|---|---|---|
| exposedField | MFString | csMaterials | NULL | — 311 |
| exposedField | SFNode | color | NULL | |
| exposedField | SFNode | normal | NULL | |
| exposedField | SFNode | texCoord | NULL | |
| exposedField | SFNode | colorTexture | NULL | — 313 |
| exposedField | SFNode | materialTexture | NULL | — 315 |
| exposedField | SFNode | textureTransform | NULL | |
| field | MFInt32 | colorIndex | [] | # [-1,inf) |
| field | MFInt32 | coordIndex | [] | # [-1,inf) |
| field | MFInt32 | normalIndex | [] | # [-1,inf) |
| field | MFInt32 | colorTexCoordIndex | [] | # [0,inf) — 317 |
| field | MFInt32 | materialTexCoordIndex | [] | # [0,inf) — 319 |
| } | | | | |

| 1 | 1 | 1 | 1 | 1 | 0 | 0 | 0 | 0 | 0 | 0 | 0 | 0 | 0 | 0 | 0 |
|---|---|---|---|---|---|---|---|---|---|---|---|---|---|---|---|
| 0 | 1 | 1 | 1 | 1 | 0 | 0 | 0 | 0 | 2 | 1 | 0 | 0 | 0 | 0 | 0 |
| 0 | 0 | 1 | 1 | 1 | 0 | 0 | 0 | 2 | 2 | 1 | 1 | 0 | 0 | 0 | 0 |
| 0 | 0 | 0 | 1 | 1 | 0 | 0 | 2 | 2 | 2 | 1 | 1 | 1 | 0 | 0 | 0 |
| 0 | 0 | 0 | 0 | 1 | 1 | 0 | 2 | 2 | 2 | 1 | 1 | 1 | 1 | 0 | 0 |
| 0 | 0 | 0 | 0 | 0 | 1 | 0 | 2 | 2 | 2 | 2 | 1 | 1 | 1 | 1 | 0 |

| 2 | 2 | 2 | 2 | 2 | 0 | 0 | 0 | 0 | 0 | 0 | 0 | 0 | 0 | 0 | 0 |
|---|---|---|---|---|---|---|---|---|---|---|---|---|---|---|---|
| 1 | 2 | 2 | 2 | 2 | 0 | 0 | 0 | 0 | 0 | 0 | 0 | 0 | 0 | 0 | 0 |
| 1 | 1 | 2 | 2 | 2 | 0 | 0 | 0 | 0 | 0 | 0 | 0 | 0 | 0 | 0 | 0 |
| 1 | 1 | 1 | 2 | 2 | 0 | 0 | 0 | 0 | 0 | 0 | 0 | 0 | 0 | 0 | 0 |
| 1 | 1 | 1 | 1 | 2 | 2 | 0 | 0 | 0 | 0 | 0 | 0 | 0 | 0 | 0 | 0 |
| 1 | 1 | 1 | 1 | 1 | 2 | 0 | 0 | 0 | 0 | 0 | 0 | 0 | 0 | 0 | 0 |

FIG. 5

```
IndexedMaterialSet {
    unit "mm"
    surfaceThickness      2.0
    acquisitionResolution 0.1
    coord Coordinate {
        point [ 0 0 0 , 1 0 0 , 1 1 0 , 0 1 0 , 0 1 1 , 0 0 1 , 1 0 1 , 1 1 1 , 0.5 0.5 0 ]
    }
    texCoord TextureCoordinate {
        point [ 0 0 , 0.333 0 , 0.667 0 , 1 0 , 0 1 , 0.333 1 , 0.667 1 , 1 1 , 0.1667 0.5 ]
    }
    materialRegion [
        MaterialRegion {
            csMaterials ["rubber" "steel" "plastic"]
            coordIndex [2 1 8 -1, 1 0 8 -1, 0 3 8 -1, 3 2 8 -1, 1 2 7 -1, 7 6 1 -1, 5 6 7 -1, 7 4 5 -1]
            colorTexCoordIndex [5 1 0 4 7 6 2 3 8]
            colorTexture      ImageTexture    { url "../pix/136.png" }
            materialTexture   ImageTexture    { url "../material/136_material.png" }
        }
        MaterialRegion {
            csMaterials ["rubber" "steel" "plastic"]
            coordIndex [4 3 0 -1, 0 5 4 -1, 6 5 0 -1, 0 1 6 -1, 3 4 7 -1, 7 2 3 -1]
            colorTexCoordIndex [4 7 6 5 1 0 3 2]
            colorTexture      ImageTexture    { url "../pix/245.png" }
            materialTexture   ImageTexture    { url "../material/245_material.png" }
        }
    ] #materialRegion
}
```

FIG. 6
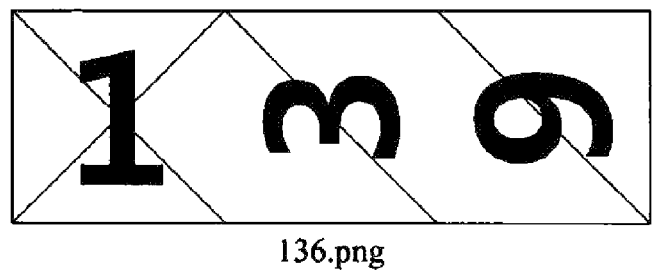
136.png
245.png
FIG. 7
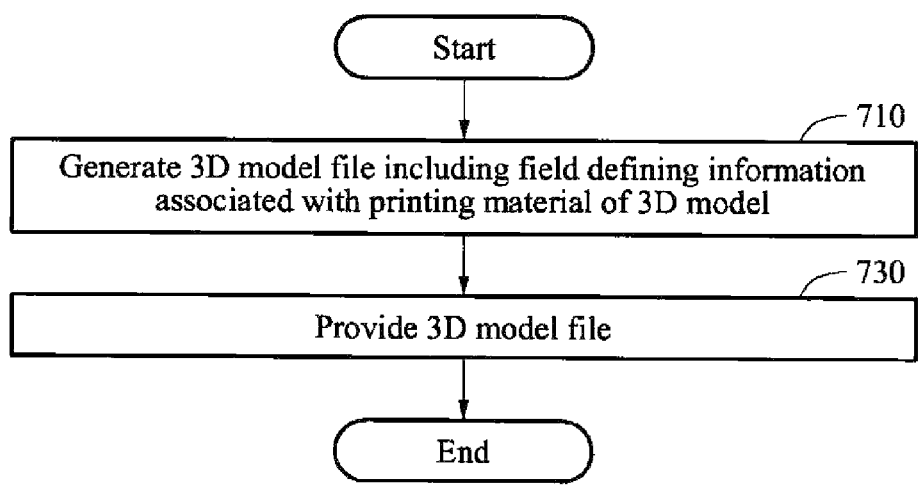

THREE-DIMENSIONAL (3D) MODEL FILE, AND APPARATUS AND METHOD FOR PROVIDING 3D MODEL FILE

CROSS-REFERENCE TO RELATED APPLICATIONS

This application claims the benefit of Korean Patent Application No. 10-2014-0136985 and of Korean Patent Application No. 10-2015-0085059, respectively filed on Oct. 10, 2014 and Jun. 16, 2015, in the Korean Intellectual Property Office, the disclosures of which are incorporated herein by reference.

BACKGROUND

1. Field of the Invention

Embodiments relate to a three-dimensional (3D) model file, and an apparatus and method for providing the 3D model file.

2. Description of the Related Art

Currently, various materials are being used in three-dimensional (3D) printers. Various materials may include, for example, plastic (for example, an acrylonitrile-butadiene-styrene (ABS) resin or acrylic materials), metal (for examples, stainless steel or silver), rubber, ceramic materials, or biomaterials, or food (for examples, chocolate or powder). Also, even the same material may have different properties, for example, a thermal resistance that is a degree to which materials resist heat, a durability that is a degree to which materials endure, or a low-temperature resistance that is a degree to which materials resist a low temperature.

It is difficult for a user (for example, a person who desires to perform printing) to select one of the above materials to print a 3D model. In addition, a designer who makes a 3D model may design the 3D model to print a portion of the 3D model using plastic and print another portion of the 3D model using metal.

During manufacturing of the 3D model with the above different materials, exact information associated with a design of the 3D model needs to be transferred. Because when inexact information associated with the design is transferred, a result of printing based on an intention quite different from an intention of the designer may be obtained.

Accordingly, there is a desire to provide exact printing material information for each component to print a 3D model.

SUMMARY

Embodiments provide a method of effectively providing a user desiring to perform printing with information, for example, material information of a three-dimensional (3D) model made by a designer, a unit of a length of modeling or a scan resolution measured when a scanner is used, to use the information for 3D printing.

In addition, embodiments provide a method of efficiently perform 3D printing by providing a user desiring to perform the 3D printing with additional information, for example information about materials defined by a modeler, in a standard file format.

According to an aspect there is provided a method of providing a 3D model file, the method including generating a 3D model file including a first field defining information associated with a printing material of a 3D model to perform 3D printing, and providing the 3D model file.

The 3D model file may further include a second field defining a unit of a length of coordinates of each of vertices of the 3D model.

The 3D model file may further include a third field defining information associated with a scan resolution of the 3D model.

The 3D model file may further include a fourth field defining information associated with a surface thickness of the 3D model.

A value of the scan resolution may be expressed in the same unit as the unit of the length.

A value of the surface thickness may be expressed in the same unit as the unit of the length.

The 3D model file may further include at least one of a second field defining a unit of a length of coordinates of each of vertices of the 3D model, a third field defining information associated with a scan resolution of the 3D model and a fourth field defining information associated with a surface thickness of the 3D model.

The first field may include at least one of a material field defining the printing material, a first texture field defining a color texture of a color, a second texture field defining a map of a material texture of the printing material, a first index field defining coordinate values of the color texture, and a second index field defining coordinate values of the material texture.

The first field may be defined for each of regions of the 3D model.

According to another aspect, there is provided an apparatus for providing a 3D model file, the apparatus including a file generator configured to generate a 3D model file including a first field defining information associated with a printing material of a 3D model to perform 3D printing, and a file provider configured to provide the 3D model file.

The 3D model file may further include at least one of a second field defining a unit of a length of coordinates of each of vertices of the 3D model, a third field defining information associated with a scan resolution of the 3D model and a fourth field defining information associated with a surface thickness of the 3D model.

The first field may include at least one of a material field defining the printing material, a first texture field defining a color texture of a color, a second texture field defining a map of a material texture of the printing material, a first index field defining coordinate values of the color texture, and a second index field defining coordinate values of the material texture.

The first field may be defined for each of regions of the 3D model.

According to another aspect, there is provided a 3D model file including a field defining vertex information of a 3D model to perform 3D printing, and a first field defining information associated with a printing material of the 3D model.

The 3D model file may further include a second field defining a unit of a length of coordinates of each of vertices of the 3D model.

The 3D model file may further include a third field defining information associated with a scan resolution of the 3D model.

The 3D model file may further include a fourth field defining information associated with a surface thickness of the 3D model.

The 3D model file may further include at least one of a second field defining a unit of a length of coordinates of each of vertices of the 3D model, a third field defining information associated with a scan resolution of the 3D model and a fourth field defining information associated with a surface thickness of the 3D model.

The first field may include at least one of a material field defining the printing material, a first texture field defining a color texture of a color, a second texture field defining a map of a material texture of the printing material, a first index field defining coordinate values of the color texture, and a second index field defining coordinate values of the material texture.

The first field may be defined for each of regions of the 3D model.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 2 illustrates IndexedMaterialSet of a file format of a 3D model file according to an embodiment;

FIG. 3 illustrates MaterialRegion included in IndexedMaterialSet of FIG. 2;

FIG. 5 illustrates an example of a file format of a 3D model file according to an embodiment;

FIG. 6 illustrates an example of texture information of the 3D model file of FIG. 5; and FIG. 7 is a flowchart illustrating an operating method of the 3D model file providing apparatus of FIG. 1.

DETAILED DESCRIPTION

Figure 1:
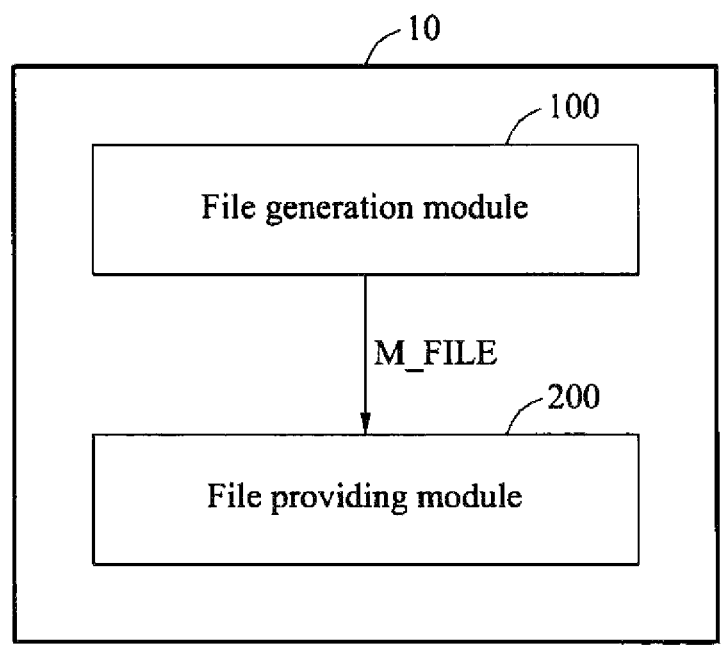
FIG. 1 is a block diagram illustrating a three-dimensional (3D) model file providing apparatus according to an embodiment.

Particular structural or functional descriptions of embodiments according to the concept of the present invention disclosed in the present disclosure are merely intended for the purpose of describing embodiments according to the concept of the present invention and the embodiments according to the concept of the present invention may be implemented in various forms and should not be construed as being limited to those described in the present disclosure.

Various alterations and modifications may be made to embodiments, some of which will be illustrated in detail in the drawings and detailed description. However, it should be understood that these embodiments are not construed as limited to the illustrated forms and include all changes, equivalents or alternatives within the idea and the technical scope of this disclosure.

Although terms of "first," "second," etc. are used to explain various components, the components are not limited to such terms. These terms are used only to distinguish one component from another component. For example, a first component may be referred to as a second component, or similarly, the second component may be referred to as the first component without departing from the spirit or scope of the present invention.

When it is mentioned that one component is "connected" or "accessed" to another component, it may be understood that the one component is directly connected or accessed to another component or that still other component is interposed between the two components. On the contrary, when it is mentioned that one component is "directly connected" or "directly accessed" to another component, it may be understood that no component is interposed therebetween. Other expressions used to describe the relationship between components should be interpreted in a like fashion (e.g., "between" versus "directly between," or "adjacent" versus "directly adjacent").

Terms used herein are to merely explain certain embodiments, not meant to limit the scope of the present specification. A singular expression includes a plural concept unless there is a contextually distinctive difference therebetween. In this description, the term "include" or "have" is intended to indicate that characteristics, numbers, steps, operations, components, elements, etc. disclosed in the specification or combinations thereof exist. As such, the term "include" or "have" should be understood that there are additional possibilities of one or more other characteristics, numbers, steps, operations, components, elements or combinations thereof.

Unless specifically defined, all the terms used herein including technical or scientific terms have the same meaning as terms generally understood by those skilled in the art. Terms defined in a general dictionary should be understood so as to have the same meanings as contextual meanings of the related art. Unless definitely defined in the present invention, the terms are not interpreted as ideal or excessively formal meanings.

Hereinafter, embodiments will be described in more detail with reference to the attached drawings.

An existing three-dimensional (3D) object representation method used in international standards, for example moving picture experts group (MPEG) standards or virtual reality modeling language (VRML) standards, does not include a method of defining materials used for 3D printing. To represent these materials, a 3D model file providing method may be performed based on the following two requirements.

As a first requirement, in the 3D model file providing method, material information may need to be defined, similarly to an existing 3D modeling method, and accordingly a modeler may easily apply the 3D model file providing method.

As a second requirement, in the 3D model file providing method, material information may need to be defined for each region, for example each part, of a 3D model. For example, when a vehicle is printed at once, allocation of materials for each part of the vehicle needs to be supported. In this example, tires, wheels and a body of the vehicle may be formed of rubber, iron and plastic, respectively.

To satisfy the two requirements, the 3D model file providing method may include operations below.

For the first requirement, the 3D model file providing method may define a "material texture" similarly to allocating of textures for each face.

For the second requirement, the 3D model file providing method may divide a 3D model into parts, for example, regions. The 3D model file providing method may designate a single material for each of the parts, or may assign material texture information to each of the parts and designate printing materials for each face of each of the parts.

Also, the 3D model file providing method may designate information, for example, information regarding an actual printing size of a 3D model, a scan resolution of a model generated using a scanner or a thickness of a surface to be printed. To this end, the 3D model file providing method may assign length information (for example, a unit of a length, or whether a length is measured in millimeters (mm)

or centimeters (cm)) associated with each vertex information of the 3D model, and may designate information regarding the resolution of the scanner or the thickness of the surface.

A model for 3D printing, hereinafter referred to as a 3D model file may include vertex information, connection information or color information. The 3D model file providing method may provide information about materials in addition to the above information, and accordingly a user may select an optimum printing material.

A 3D model file may include vertex information, connection information or color information. The 3D model file providing method may provide a unit of the vertex information in addition to the above information, and accordingly a user may infer a size of a result of printed 3D model.

A 3D model file may include vertex information, connection information or color information. The 3D model file providing method may provide surface thickness information in addition to the above information, and accordingly a 3D model to be printed may become hollow and a ground to create a thickness may be provided.

A 3D model file may include vertex information, connection information or color information. The 3D model file providing method may provide scan resolution information in addition to the above information, and accordingly a user or a 3D printer may use the 3D model file providing method to determine a layer thickness in additive manufacturing.

In the present disclosure, a module may refer to hardware capable of performing a function and operation based on each name described in the present disclosure, a computer program code to perform a specific function and operation, or an electronic recording medium, for example a processor or a microprocessor, including a computer program code capable to perform a specific function and operation.

In other words, the module may refer to a functional and/or structural combination of hardware configured to achieve a technical idea of the present invention and/or software configured to instruct the hardware to operate.

FIG. 1 is a block diagram illustrating a 3D model file providing apparatus 10 according to an embodiment.

Referring to FIG. 1, the 3D model file providing apparatus 10 may include a file generation module 100 and a file providing module 200. The file generation module 100 and the file providing module 200 may be referred to as a "file generator" and a "file provider," respectively.

The 3D model file providing apparatus 10 may generate a 3D model file M_FILE, and may provide the 3D model file M_FILE to a user and/or a 3D printer to print a 3D model.

In an example, the 3D model file providing apparatus 10 may be implemented as an apparatus independent of the 3D printer, and may be communicably connected to the 3D printer using various schemes including a local or remote connection.

In another example, the 3D model file providing apparatus 10 may be included in the 3D printer.

In other words, the 3D model file providing, apparatus 10 may refer to all 3D printing, supporting devices configured to support a variety of information in the 3D printer.

The file generation module 100 may generate the 3D model file M_FILE.

In an example, the file generation module 100 may generate a 3D model file M_FILE including a first field defining information associated with a printing material of a 3D model to perform 3D printing.

In another example, the file generation module 100 may generate a 3D model file M_FILE including at least one of a second field defining a unit of a length of coordinates of each of vertices of a 3D model, a third field defining information associated with a scan resolution of the 3D model and a fourth field defining information associated with a surface thickness of the 3D model.

The file generation module 100 may transmit the 3D model file M_FILE to the file providing module 200.

The file providing module 200 may provide or transmit the 3D model file M_FILE to the user and/or the 3D printer. To transmit the 3D model file M_FILE, the file providing module 200 may perform a communication function using various schemes.

Hereinafter, a method of providing the 3D model file M_FILE and a format of the 3D model file M_FILE will be further described.

Figures 4A, 4B:
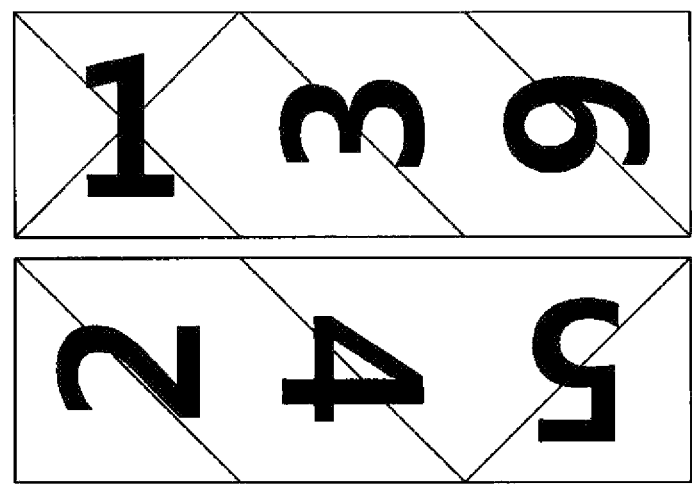
FIG. 4A illustrates an example of colorTexture of MaterialRegion of FIG. 3.
FIG. 4B illustrates an example of materialTexture of MaterialRegion of FIG. 3.

FIG. 2 illustrates IndexedMaterialSet of a file format of a 3D model file according to an embodiment, and FIG. 3 illustrates MaterialRegion included in IndexedMaterialSet of FIG. 2. FIGS. 4A and 4B illustrate colorTexture and materialTexture of MaterialRegion of FIG. 3, respectively.

Referring to FIGS. 1 through 4B, the 3D model file M_FILE, for example IndexedMaterialSet of FIG. 2 and MaterialRegion of FIG. 3, may include information for 3D printing in a method of representing IndexedMaterialSet in existing International Organization for Standardization (ISO)/International Electrotechnical Commission (IEC) 14496-16.

In an example, the 3D model file M_FILE, for example, IndexedMaterialSet may include a first field 310, for example, MaterialRegion. The first field 310 may define information associated with a printing material of a 3D model to perform 3D printing. The first field 310 may be defined for each of regions of the 3D model.

The first field 310, for example, MaterialRegion, may include at least one of a plurality of fields that define information associated with the printing material of the 3D model. The plurality of fields may include, for example, a material field 311, a first texture field 313, a second texture field 315, a first index field 317, and a second index field 319.

The material field 311 may define the printing material of the 3D model. The first texture field 313 may define a color texture of a color, for example, a color of the printing material. The second texture field 315 may define a map of a material texture of the printing material. The first index field 317 may define coordinate values of the color texture, and the second index field 319 may define coordinate values of the material texture.

In another example, IndexedMaterialSet may further include at least one of a second field 330, a third field 350 and a fourth field 370. The second field 330 may define a unit of a length of coordinates of each of vertices of the 3D model. The third field 350 may define information associated with a scan resolution of the 3D model, and the fourth field 370 may define information associated with a surface thickness of the 3D model.

Information included in the above-described fields (for example, the first field 310, the material field 311 the first texture field 313, the second texture field 315, the first index field 317, and the second index field 319, the second field 330, the third field 350 and the fourth field 370) may be defined as shown in Table 1 below.

TABLE 1

| Field name | Information |
|---|---|
| Unit | Has a value of a string type, and defines a unit of coordinate values of a vertex. All unit information may be available by a standardized method. A classification scheme defined in MPEG-7, and a classification scheme defined in MPEG-V may be used. In the schemes, mm, or cm may be used as a unit of a length. If a value of unit corresponds to mm, coordinates of each vertex are interpreted as mm. |
| surfaceThickness | Indicates a standard thickness of an object to be actually printed. For example, if modeling of a cylinder is performed and surfaceThickness is defined as 5, information may indicate printing of a cylinder having a surface thickness of 5 mm. A unit of a value of surfaceThickness is based on a unit of unit. |
| acquisitionResolution | Indicates a resolution when scanning is performed using a scanner. acquisitionResolution having a value of "0.5" indicates that a minimum unit of scanning is 0.5 mm. In other words, because a resolution during printing less than 0.5 mm is meaningless, printing may be performed at a value greater than 0.5 mm, to improve a printing speed. A unit of a value of acquisitionResolution is based on a unit of unit. |
| materialRegion | Indicates information of materials for each region, and is based on a definition of node MaterialRegion of FIG. 3. A plurality of values may be used, and if only a single value is defined, an entire model may be defined as a single region. |
| csMaterial | Has a value of a string type, and indicates information of used materials. If a value is defined in the form of a classification scheme, a value defined in other standards may be used. A plurality of values may be used, and if only a single value is defined, a single material may be used in a single region. |
| colorTexture | Defines texture information about colors used in each region. General digital images, e.g., Joint Photographic Experts Group (JPEG) or Portable Network Graphics (PNG) may be used. |
| materialTexture | Defines a texture map associated with materials used in each region. Images, e.g., JPEG or PNG may be used, and a value of "0" to "(number of csMaterial − 1)" may be used. If ["rubber" "steel" "plastic"] is defined in csMaterial, one of values of "0," "1" and "2" may be used in a texture image. The values of "0," "1" and "2" are mapped to rubber, steel and plastic, respectively. Here, a material texture may be defined as shown in FIG. 3. As shown in FIG. 4B, materialTexture may have one of values of "0," "1" and "2." |
| colorTexCoordIndex | Defines coordinate values of a color texture. |
| materialTexCoordIndex | Defines coordinate values of a material texture. If the coordinate values are not defined, materialTexCoordIndex uses colorTexCoordIndex. |

FIG. 5 illustrates an example of a file format of a 3D model file according to an embodiment, and FIG. 6 illustrates an example of texture information used in the 3D model file of FIG. 5.

Referring to FIGS. 5 and 6, it may be found that mm is used as a unit of a vertex, that coordinates of a vertex is (10 mm, 10 mm, 10 mm), and that a regular hexahedron having size of 1 cm in an actual size is printed as a 3D model. Also, a thickness of a surface is 2 mm, and accordingly an empty 3D model with a thickness of 2 mm may be printed during actual printing. A scan acquisition resolution is 0.1 mm, and accordingly a moderate layer thickness of a 3D printer may be equal to or greater than 0.1 mm. For example, when textures having a value of numbers "1" to "6" are printed on a dice, the dice may be divided into two regions. Texture information shown in FIG. 6 may be used. In FIG. 6, faces numbered as 1, 3 and 6 of the dice may correspond to a region, faces numbered as 2, 4 and 5 may correspond to another region. The region corresponding to the faces 1, 3 and 6 may have "135.png" as colorTexture, and "135_material.png" as materialTexture. In an upper part of the face numbered as 1, materialTexture is "1," and accordingly may be printed using steel. In a lower part of the face numbered as 1, materialTexture is "0," and accordingly may be printed using rubber. Because materialTexCoordIndex does not exist in each MaterialRegion, colorTexCoordIndex may be used as information of materialTexCoordIndex.

When a 3D model file M_FILE with the file format of FIG. 5 is transferred to a 3D printer, for example, printing software, the printing software may parse the 3D model file M_FILE as IndexedMaterialSet, and may be ready to interpret IndexedMaterialSet. Unit, surfaceThickness, and information may be sequentially parsed, a thickness and physical size information of an object to be printed may be recognized, and information of each region may be verified. Material information defined by a modeler, for example, a designer may be loaded in a region, whether a 3D printer capable of performing actual printing exists may be determined, and actual printing may be performed based on material texture information. In this example, additive manufacturing may be performed based on information about a thickness greater than a value of acquisitionResolution. When the additive manufacturing is performed based on a value less than the value of acquisitionResolution, an accuracy may have no meaning.

FIG. 7 is a flowchart illustrating an operating method of the 3D model file providing apparatus 10 of FIG. 1.

Referring to FIG. 7, in operation 710, the file generation module 100 may generate a 3D model file M_FILE including a first field defining information associated with a printing material of a 3D model to perform 3D printing.

In operation 730, the file providing module 200 may provide or transmit the 3D model file M_FILE to a user and/or a 3D printer.

The units described herein may be implemented using hardware components, software components, or a combination thereof. For example, the hardware components may include microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of generating a three-dimensional (3D) model file, the method comprising:
    generating a region field defining information associated with a printing material of a 3D model; and
    generating a material field defining the printing material,
    wherein the region field comprises the material field, a color texture coordinate index field defining coordinate indexes of color texture, and a material texture coordinate index field defining coordinate indexes of material texture, and
    wherein when the material texture coordinate index field is null, the color texture coordinate index field is used as the material texture coordinate index field.

2. The method of claim 1, wherein the 3D model file further comprises a unit field defining a unit of a length of vertices of the 3D model.

3. The method of claim 2, wherein the 3D model file further comprises a resolution field defining information associated with a scan resolution of the 3D model.

4. The method of claim 3, wherein the 3D model file further comprises a surface thickness field defining information associated with a surface thickness of the 3D model.

5. The method of claim 3, wherein a value of the scan resolution is expressed in the same unit as the unit of the length.

6. The method of claim 4, wherein a value of the surface thickness is expressed in the same unit as the unit of the length.

7. The method of claim 1, wherein the 3D model file further comprises at least one of a unit field defining a unit of a length of vertices of the 3D model, and a resolution field defining information associated with a scan resolution of the 3D model.

8. The method of claim 1, wherein the region field further comprises at least one of a color texture field defining the color texture, and a material texture field defining a texture map of the printing material.

9. The method of claim 1, wherein the region field is defined for each of regions of the 3D model.

10. A three-dimensional (3D) model file comprising:
    a region field defining information associated with a printing material of the 3D model; and
    a material field defining the printing material,
    wherein the region field comprises the material field, a color texture coordinate index field defining coordinate indexes of color texture, and a material texture coordinate index field defining coordinate indexes of material texture, and
    wherein when the material texture coordinate index field is null, the color texture coordinate index field is used as the material texture coordinate index.

11. The 3D model file of claim 10, further comprising a unit field defining a unit of a length of vertices of the 3D model.

12. The 3D model file of claim 11, further comprising a resolution field defining information associated with a scan resolution of the 3D model.

13. The 3D model file of claim 12, further comprising a surface thickness field defining information associated with a surface thickness of the 3D model.

14. The 3D model file of claim 10, further comprising at least one of a unit field defining a unit of a length of vertices of the 3D model, and a resolution field defining information associated with a scan resolution of the 3D model.

15. The 3D model file of claim 10, wherein the region field comprises at least one of a color texture field defining the color texture, and a material texture field defining a texture map of the printing material.

16. The 3D model file of claim 10, wherein the region field is defined for each of regions of the 3D model.

17. The 3D model file of claim 12, wherein a value of the scan resolution is expressed in the same unit as the unit of the length.

18. The 3D model file of claim 10, wherein a value of the surface thickness is expressed in the same unit as the unit of the length.

* * * * *